(12) United States Patent
Wu et al.

(10) Patent No.: US 6,479,014 B1
(45) Date of Patent: Nov. 12, 2002

(54) SAW BLADE TIPS AND ALLOYS THEREFOR

(75) Inventors: James B. C. Wu, St. Louis, MO (US); Damadoran Raghu, Elkhart, IN (US); Bradley McKee, Belleville (CA)

(73) Assignee: Deloro Stellite Company, Inc., St. Louis, MO (US)

( * ) Notice: Subject to any disclaimer, the term of this patent is extended or adjusted under 35 U.S.C. 154(b) by 0 days.

(21) Appl. No.: 09/626,990

(22) Filed: Jul. 27, 2000

Related U.S. Application Data

(60) Provisional application No. 60/145,637, filed on Jul. 27, 1999.
(51) Int. Cl.[7] ............................................... C22C 19/07
(52) U.S. Cl. ........................ 420/436; 420/440; 148/425
(58) Field of Search .................... 420/436, 440; 148/425

(56) References Cited

U.S. PATENT DOCUMENTS 5,242,758 A * 9/1993 Hitchcock et al. .......... 428/547

FOREIGN PATENT DOCUMENTS

JP           62037355 A    *  2/1987

* cited by examiner

Primary Examiner—John Sheehan
Assistant Examiner—Andrew L. Oltmans
(74) Attorney, Agent, or Firm—Senniger, Powers, Leavitt & Roedel

(57) ABSTRACT

A Co-based saw tip for attachment to saw blades for cutting wood, the saw tip formed from an alloy containing Mo in an amount from about 4 to about 20% by weight, Cr, C, and the balance Co. Certain embodiments specifically avoid all W. The tip optionally further contains elements selected from the group consisting of Mn, Si, Ni, B and Fe.

13 Claims, No Drawings

SAW BLADE TIPS AND ALLOYS THEREFOR

This application claims the benefit of provisional application No. 60/145,637 filed Jul. 27, 1999.

BACKGROUND OF THE INVENTION

This invention relates to alloys for tips to be welded or brazed onto wood cutting saws.

Wood cutting saw blades deteriorate at the cutting tips at a high rate, especially in modernized saw mills equipped with high speed saws. When saw tips become dull, cutting efficiency is greatly reduced. Most saw mills have their own shop to sharpen or "re-tip" the saw blades.

Commonly used saw tip materials comprise tungsten carbide composites, which are fine tungsten carbide particles dispersed in a cobalt matrix. These composites have excellent abrasion resistance as is required for saw tip applications, but tend to deteriorate in the presence of corrosive wood juice. Another disadvantage of tungsten carbide tips is that they are often brazed onto saws using cadmium-containing brazing alloys, and cadmium is considered to be hazardous. Furthermore, the strength of the brazing material is often inadequate, such that the tips break off at the bond, especially when cutting frozen wood in winter months.

Cobalt-chromium-tungsten alloys, namely, certain alloys distributed under the trade designation STELLITE®, have also been used in saw tip applications. The constituents in these cobalt-based alloys which have primary effect on hardness are as follows:

| Alloy | Composition (wt %) | | | Hardness (HRC) |
|---|---|---|---|---|
| | C | Cr | W | |
| STELLITE 12 | 1.5 | 29 | 8.5 | 45 |
| STELLITE 1 | 2.5 | 29 | 13 | 52 |
| STELLITE 19 | 1.8 | 31 | 11 | 50 |

These alloys contain complex carbides rich in chromium. Although there is some partition of tungsten in the carbides, much of the tungsten remains in solid solution. This is due to the large size of the tungsten atoms, which results in sluggish diffusion through the matrix. Tips manufactured from these alloys have enhanced corrosion resistance as compared to tungsten carbide composites. Furthermore, these alloys can be welded onto saws by electric resistance welding or gas-tungsten-arc welding, which welding techniques produce a stronger metallurgical bond than brazing. These alloys, however, are typically not selected for applications such as non-corrosive or mildly corrosive wood cutting, because their abrasion resistance is generally inferior to conventional tungsten carbide composites.

SUMMARY OF THE INVENTION

It is an object of this invention, therefore, to provide a saw tip which is attachable to saw blades by welding, and which has abrasion resistance comparable to conventional tungsten carbide tips; to provide a saw tip which has enhanced corrosion resistance as well as abrasion resistance comparable to abrasion resistance of tungsten carbide tips; to provide a saw tip having enhanced corrosion and abrasion resistance as compared to cobalt-chromium-tungsten saw tips; and to provide a saw tip having enhanced corrosion resistance in reducing-type corrosive wood cutting environments.

Briefly, therefore, the invention is directed to a saw blade Co-based saw tip for attachment to a saw blade for cutting wood, the saw tip comprising Mo in an amount from about 4 to about 20% by weight, Cr, and C.

The invention is also directed to a saw tip for attachment to a saw blade for cutting wood, the tip comprising, by approximate weight %:

C 0.8–3.5
Cr 25–35
Mo 4–20
Mn, Si, Ni, B plus Fe 0–10
Co Balance.

The invention is also directed to a saw tip for attachment to a saw blade for cutting wood, the tip consisting essentially of, by approximate weight %:

C 0.8–3.5
Cr 25–35
Mo 4–20
Mn, Si, Ni, B plus Fe 0–10
Co Balance.

Another embodiment of the invention is directed to a saw tip for attachment to a saw blade for cutting wood, the tip comprising 4–10% by weight Mo and 0.8–2.0% by weight C.

A further embodiment is directed to a saw tip for attachment to a saw blade for cutting wood, the tip comprising 10–20% by weight Mo and 1.5–3.0% by weight C.

The invention is also directed to a saw tip for attachment to a saw blade for cutting wood, the tip comprising, by approximate weight %:

C 0.8–3.5
Cr 25–35
Mo 4–20
W 1–4
Mn, Si, Ni, B plus Fe 0–10
Co Balance.

Still further embodiments of the invention are directed to wrought or powder alloys for forming saw tips comprising each of the foregoing compositions, and rods from which tips are segmented upon attachment to saw blades.

Other objects and features of this invention will be in part apparent and in part point out hereinafter.

DETAILED DESCRIPTION OF THE INVENTION

The saw tip alloy of the invention comprises about the following, by weight percent:

C 0.8–3.5
Cr 25–35
Mo 4–20
Co Balance

An alternative embodiment comprises about the following, by weight percent:

C 0.8–3.5
Cr 25–35
Mo 4–20
W 1–4
Co Balance

Of the foregoing embodiments, there are especially preferred alternative high Mo/high C and low Mo/low C embodiments. The high Mo/high C embodiment comprises about the following, by weight percent:

C 0.8–3.5
Cr 25–35
Mo 10–20
W 1–4 (or 0–4)
Co Balance;
more preferably,
C 1.5–3.5
Cr 25–35
Mo 10–20
W 1–4 (or 0–4)
Co Balance.

The low Mo/low C embodiment comprises about the following, by weight percent:
C 0.8–3.5
Cr 25–35
Mo 4–10
W 1–4 (or 0–4)
Co Balance;
more preferably
C 0.8–2.0
Cr 25–35
Mo 4–10
W 1–4 (or 0–4)
Co Balance Further preferred embodiments contain elemental percentages in each of the above ranges, except that there are no intentional W additions, and the incidental occurrence of W is avoided to the extent possible.

According to this invention, Mo is employed rather than some or all of the W in Co—Cr—W alloys for saw tips in order to enhance abrasion resistance. Molybdenum atoms are much smaller than W atoms, and with an atomic weight roughly half the atomic weight of W, there are roughly twice as many Mo atoms for a given weight percentage. Molybdenum has a greater affinity for C than does W, and due to its smaller size diffuses much more quickly, thereby favoring the formation of carbides which impart abrasion resistance. Furthermore, Mo imparts greater corrosion resistance than does W in acidic environments of a reducing nature, which are often encountered in wood cutting applications.

The Mo content is in the range of about 4% to about 20% by weight. While the corrosion resistance imparted by Mo is believed to be imparted by Mo in solid solution, the wear resistance is imparted primarily by the formation of Mo carbides. The high Mo/high C embodiment is especially preferred for cutting softer woods such as pine, and in some instances is less preferred for harder woods because it is more brittle than the low Mo/low C embodiment.

Other elements such as Mn, Si, Ni, B and Fe may be present as incidental impurities, or as intentional additions to improve melting characteristics. In particular, up to about 10 wt %, preferably up to about 8 wt %, of these elements cumulatively are included in the alloy.

The alloys are prepared as powder metallurgy preforms, i.e., pre-shaped teeth or rods for cutting or automatic tipping, as cast rods for welding onto saw blades, and as solid or tubular wires for welding onto saw blades.

One further advantage of the current invention as compared to the prior tungsten carbide saw teeth is that the current alloy permits the use of a hook angle of up to as much as about 35 degrees, which corresponds to a reduction in cutting forces.

Further illustration of the invention is provided by the following working examples.

EXAMPLE 1

Saw tips were prepared of the following nominal compositions:
Composition (wt %)

| Alloy | C | Cr | W | Mo | Co | Hardness (HRC) |
|---|---|---|---|---|---|---|
| 712 | 1.5 | 29 | — | 8.5 | Bal. | 49 |
| 720 | 2.5 | 33 | — | 18 | Bal. | 62 |
| 720M | 2.2 | 32 | 1.3 | 18 | Bal. | 58 |

Saw tips made of alloys 720 and 720M were found to have wear resistance comparable to the wear resistance of tungsten carbide tips in side-by-side tests in cutting the same length of wood. The 720 and 720M tips are attachable by welding, which corresponds to a stronger bond and lower tipping costs, when compared to tungsten carbide tips.

Saw blades tipped with alloy 712 were field tested against saw blades tipped with STELLITE 12 and determined to last longer. Laboratory abrasion tests according to the ASTM G65 dry sand abrasion standards resulted in a volume loss of about 12 cubic millimeters for the 712 alloy and about 57 cubic millimeters for the STELLITE 12 alloy.

EXAMPLE 2

Three saw blades were tipped with alloys of the invention, two with prior art Stellite alloys, and one with tungsten carbide. The general characteristics of the experimental saws and sawing conditions were as follows:
Saw diameter 21 in.
Saw tooth thickness 0.120 in.
Saw blade thickness 0.070 in.
Side clearance 0.025 in.
Number of teeth 30
Clearance angle 10°
Rake angle 30°

The material cut was six-inch thick Douglas fir at a feed rate of 168 feet per minute (5120 centimeters per minute). After total of 8.5 hours of sawing time (approximately 10 km sawing path), using three experimental saw blades, the least edge recession of approximately 20 microns, or highest wear resistance, was found in the case of alloy of the invention 712 plain rod tips for all three saw blades. The alloy of the invention 712-D cast and densified rod exhibited the second highest wear resistance-edge recession from 16 to 33.6 microns. The edge recession for WC-OM1 tips ranged from 24 to 35 microns. The wear of prior art Stellite alloy 12 (with 5% WC PM) tips ranged from 26.6 to 46.6 microns. The PM Stellite rod showed high edge recession ranging from 36 to 56 microns. The greatest edge wear was for the Stellite 12 PM European style saw tips and ranged from 45 to 86 microns.

As various changes could be made in the above embodiments without departing from the scope of the invention, it is intended that all matter contained in the above description shall be interpreted as illustrative and not in a limiting sense.

What is claimed is:

1. A Co-based saw tip for attachment to a saw blade for cutting wood, the saw tip consisting essentially of about 2.5 wt % C, about 33 wt % Cr, about 18 wt % Mo, 0 wt % W, from about 0 to about 10 wt % elements selected from the group consisting of Mn, Si, Ni, B and Fe, and the balance being Co.

2. A Co-based saw tip for attachment to a saw blade for cutting wood, the saw tip consisting essentially of about 2.2 wt % C, about 32 wt % Cr, about 1.3 wt % W, about 18 wt % Mo, from about 0 to about 10 wt % elements selected from the group consisting of Mn, Si, Ni, B and Fe, and the balance being Co.

3. A Co-based saw tip alloy for the formation of saw teeth on saw blades for cutting wood, the alloy comprising Mo in an amount from about 4 to about 20% by weight, Cr, and C, wherein the alloy is prepared as a form selected from the group of forms consisting of powder metallurgy pre-shaped saw teeth, powder metallurgy pre-shaped rods for tipping saw blades, cast rods for welding onto saw blades, and wires for welding onto saw blades.

4. The Co-based saw tip alloy of claim 3 comprising, by approximate weight %:

C 0.8–3.5
Cr 25–35
Mo 4–20
Mn, Si, Ni, B plus Fe 0–10
W 0
Co Balance.

5. The Co-based saw tip alloy of claim 4 consisting essentially of, by approximate weight %:

C 0.8–3.5
Cr 25–35
Mo 4–20
Mn, Si, Ni, B plus Fe 0–10
W 0
Co Balance.

6. The Co-based saw tip alloy of claim 4 comprising 4–10% by weight Mo and 0.8–2.0% by weight C.

7. The Co-based saw tip alloy of claim 4 comprising 10–20% by weight Mo and 1.5–3.0% by weight C.

8. The Co-based saw tip alloy of claim 3 comprising, by approximate weight %:

C 0.8–3.5
Cr 25–35
Mo 4–20
W 1–4
Mn, Si, Ni, B plus Fe 0–10
Co Balance.

9. The Co-based saw tip alloy of claim 8 comprising 4–10% by weight Mo and 0.8–2.0% by weight C.

10. The Co-based saw tip alloy of claim 8 comprising 10–20% by weight Mo and 1.5–3.0% by weight C.

11. A Co-based saw tip alloy for the formation of saw (teeth on saw blades for cutting wood, the alloy consisting essentially of about 2.5 wt % C, about 33 wt % Cr, about 18 wt % Mo, from about 0 to about 10 wt % elements selected from the group consisting of Mn, Si, Ni, B and Fe, and the balance being Co.

12. A Co-based saw tip alloy for the formation of saw teeth on saw blades for cutting wood, the alloy consisting essentially of about 2.2 wt % C, about 32 wt % Cr, about 1.3 wt % W, about 18 wt % Mo, from about 0 to about 10 wt % elements selected from the group consisting of Mn, Si, Ni, B and Fe, and the balance being Co.

13. A Co-based saw tip alloy for the formation of saw teeth on saw blades for cutting wood, the alloy consisting essentially of Mo in an amount of about 8.5% by weight, Cr in an amount of about 29% by weight, C in an amount from about 0.8 to about 2.0 wt %, from about 0 to about 10 wt % elements selected from the group consisting of Mn, Si, Ni, B and Fe, and the balance being Co, wherein the alloy is prepared as a form selected from the group of forms consisting of powder metallurgy pre-shaped saw teeth, powder metallurgy pre-shaped rods for tipping saw blades, cast rods for welding onto saw blades, and wires for welding onto saw blades.

* * * * *